(12) United States Patent
Harward et al.

(10) Patent No.: US 9,037,559 B2
(45) Date of Patent: May 19, 2015

(54) FILE SYSTEM QUEUE

(75) Inventors: Nathaniel Distin Harward, San Francisco, CA (US); Dmitry Semibratov, Emerald Hills, CA (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 7 days.

(21) Appl. No.: 13/584,540

(22) Filed: Aug. 13, 2012

(65) Prior Publication Data
US 2014/0046987 A1 Feb. 13, 2014

(51) Int. Cl.
G06F 7/00 (2006.01)
G06F 17/30 (2006.01)
G06F 9/52 (2006.01)
G06F 9/54 (2006.01)

(52) U.S. Cl.
CPC ............... *G06F 9/546* (2013.01); *G06F 9/526* (2013.01); *G06F 2209/548* (2013.01)

(58) Field of Classification Search
CPC ................ G06F 17/30203; G06F 17/30238
USPC ................................... 707/764, 799
See application file for complete search history.

(56) References Cited

U.S. PATENT DOCUMENTS

| | | | | |
|---|---|---|---|---|
| 5,924,097 A * | 7/1999 | Hill et al. | | 707/703 |
| 6,779,019 B1 * | 8/2004 | Mousseau et al. | | 709/206 |
| 7,231,406 B2 * | 6/2007 | Edmonds | | 1/1 |
| 2004/0003038 A1* | 1/2004 | Huang et al. | | 709/204 |
| 2004/0049513 A1* | 3/2004 | Yakir et al. | | 707/100 |
| 2009/0089335 A1* | 4/2009 | Shitomi et al. | | 707/200 |
| 2010/0257127 A1* | 10/2010 | Owens | | 706/12 |

OTHER PUBLICATIONS

Sun Microsystems, Inc., "Network Filesystem Specification", RFC 1094, Sun Microsystems, Inc., Mar. 1989. NFS version 2 protocol specification.*
Callaghan et al. "NFS Version 3 Protocol Specification", RFC 1813, Jun. 1995.*

* cited by examiner

*Primary Examiner* — James E Richardson
(74) *Attorney, Agent, or Firm* — McAndrews, Held & Malloy, Ltd.

(57) ABSTRACT

A method and system that enables operation of a file system-based queue that supports the efficient and fair distribution of messages among a plurality of processors.

21 Claims, 6 Drawing Sheets

FILE SYSTEM QUEUE

FIELD OF THE INVENTION

Certain embodiments of the invention relate to systems and methods that support queues used in processing the assignment of tasks. More specifically, certain embodiments of the present invention relate to a system and method for efficient and fair point-to-point distribution of independent tasks among an unbounded number of local or distributed consumers.

BACKGROUND OF THE INVENTION

A number of open source and proprietary queuing systems exist including, for example, the "MQSeries" product from IBM Corporation. Additional information about the "MQSeries" product may be found at http://www.redbooks.ibm.com/redpapers/pdfs/redp0021.pdf. Existing message queue systems are generally complex and expensive to a) buy and b) run and maintain. They may complicate deployment and make an overall system more fragile by introducing separate components that need to run and to be highly available. Conventional queuing systems typically require additional software to run such as, for example, a daemon process on either a local machine or a remote machine.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that enables operation of a file system-based queue that supports the efficient and fair distribution of messages among a plurality of processors, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention are related to systems and methods that support queues used in the distribution of messages. More specifically, certain embodiments of the present invention relate to a system and method for efficient and fair point-to-point distribution of independent tasks among an unbounded number of local or distributed consumers.

A representative embodiment of the present invention may use any computer file system with Unix-like behavior as a language-independent and persistent point-to-point queue manager. A representative embodiment of the present invention may be used on a single computer system or may be distributed between or among computer systems by using a distributed file system such as, for example, the Network File System (NFS), or another distributed file system, without modifications, to form a distributed queuing system as described herein.

A representative embodiment of the present invention offers many features of commercial and open source queuing systems with, however, a far simpler interface, programming language independence, and the ability to run on a single system and/or seamlessly run in a distributed environment. A representative embodiment of the present invention may be embodied in a software application, or as a standalone software product with multiple programming language bindings.

A representative embodiment of the present invention does not require additional software such as, for example, one or more daemon processes on either a local machine or a remote machine, in order to operate. Instead, a representative embodiment of the present invention is effectively a queuing system that may be directly embedded in a software application, and which can seamlessly run in a distributed environment without the need of separate machines or separate processes to manage or oversee access by multiple, independent applications. In addition, the approach described herein is programming language independent, in that any programming language or process with access to the network file system can access and use a file system queue in accordance with a representative embodiment of the present invention, in league with any other application or process written in any other programming language.

It should be noted that although a representative embodiment of the present invention enables any software application to communicate messages to another task/process and remain durable across application failures, the software application need not be distributed. It should also be noted that although the illustrative examples described herein may refer to the sharing of one or more message queues by more than one computer, the sharing of a file system queue in accordance with a representative embodiment of the present invention may be by two or more software processes running on a single computer, or running on different computers, without departing from the spirit and scope of the present invention.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
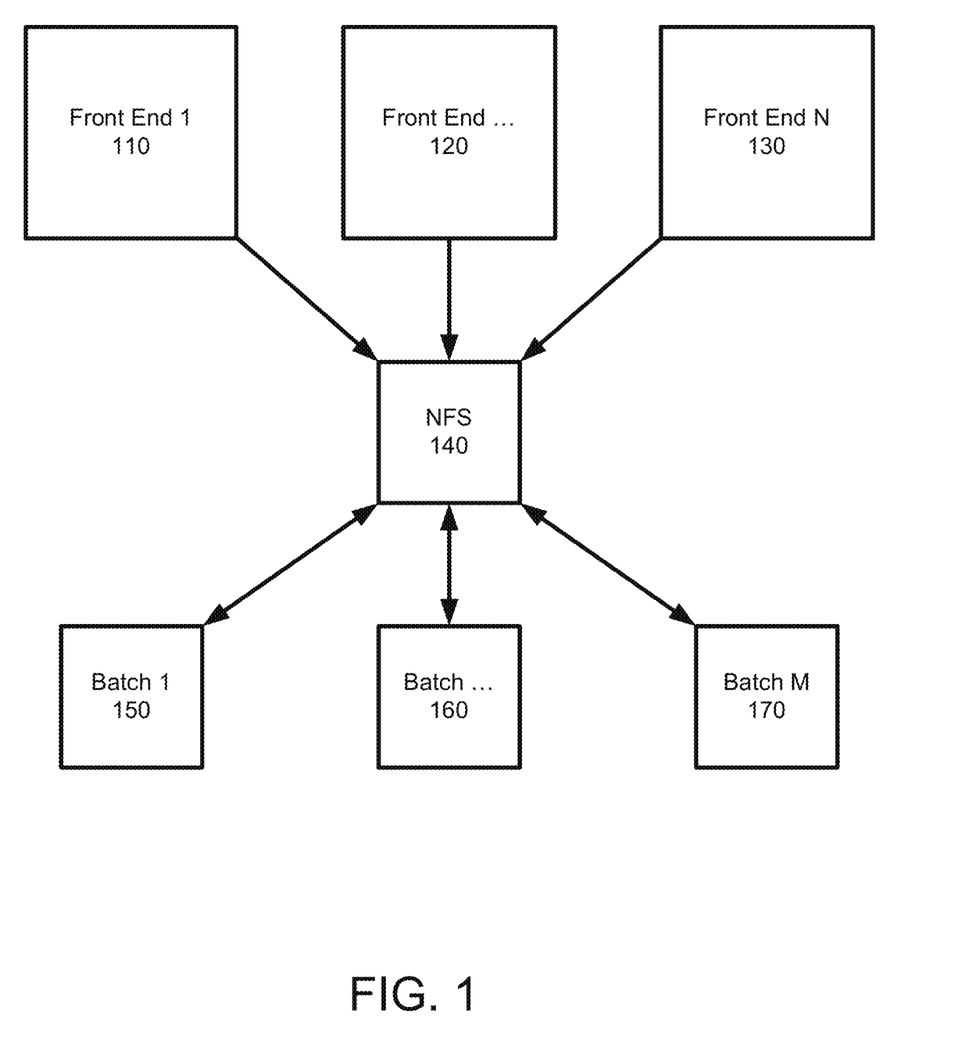
FIG. 1 is a block diagram of an exemplary system having a plurality of front end computers that receive and store messages destined for a plurality of batch computers, using a queuing mechanism that resides in a network file system, in accordance with a representative embodiment of the present invention.

FIG. 1 is a block diagram of an exemplary system 100 having a plurality of front end computers 110, 120, 130 that receive and store messages destined for a plurality of batch computers 150, 160, 170, using a queuing mechanism that resides in a network file system 140, in accordance with a representative embodiment of the present invention. The terms "front end computer" or "front end machine" may be used herein to refer to those computers of system 100 that receive information to be processed by the system 100, while the terms "batch computer" or "batch machine" may be used herein to refer to those computers that perform a particular type of processing, possibly according to a schedule, and that do not directly interact with a user. Although the term "batch" when used in regard to a computer may in the case of the present example refer to a computer that may periodically process collected data, that is not necessarily a specific limitation of the present invention, unless explicitly recited in the accompanying claims. Although the example of the present discussion is described as including "batch computers," a representative embodiment of the present invention may be employed on various types of computers that may be referred to as, for example, batch, non-batch, transactional, interactive, real-time, standalone, and/or embedded systems.

In a representative embodiment of the present invention, the front end computers 110, 120, 130 may, for example, be computers supporting one or more public web-sites that enable vendor submission of files of information such as, for example, data representing the vendor's inventory of items for sale via a web-based marketplace associated with the system 100. A number of individual vendors may separately or concurrently access the front end computers 110, 120, 130 via such a public web-site and may, for example, submit large volumes of data representing information for listing of items offered for sale by each of the vendors. The messages received from the vendors by the front end computers 110, 120, 130 may be queued in the network file system 140 for later processing by one of the batch computers 150, 160, 170 into a form suitable for presentation on the web-based marketplace. The network file system 140 may, for example, operate according to any of the Network File System Protocol Specifications described, for example, in any of the Internet Engineering Task Force documents RFC 1094, RFC 1813, or later follow-on specifications developed under the auspices of the Internet Society.

It should be noted that although the example application described herein is a particular use of a file system queue in accordance with a representative embodiment of the present invention, the example provided is for illustrative purposes only, as an aid in understanding the concepts of the present invention, and does not necessarily represent specific limitations of the present invention, unless explicitly recited in the accompanying claims.

A representative embodiment of the present invention may, for example, utilize certain functionality present in the Unix™ operating system, and many Unix™-like operating systems such as, for example, Linux and Posix. Equivalent file management functionality may be found in many other operating systems. A notable exception includes the family of Microsoft Windows™ operating systems, whose file systems have fundamental behaviors that are different from those of Unix-like operating systems.

It should be noted that in the following discussion, a reference to moving a file does not involve movement or copying of the contents of the file, but rather the execution of a call to operating system functionality such as the "rename(const char *oldpath, const char *newpath)" system call present in Linux and other Unix-like operating systems. In this example system call for accessing the desired functionality in Linux, the "oldpath" parameter identifies the file path of the file to be "moved," and "newpath" parameter identifies the path at which the file will be accessible following successful completion of the system call.

In a representative embodiment of the present invention, a particular file system directory may be designated to be the "root" or lowest level directory for use by what is referred to herein as a "queue manager," and individual queues may be created as sub-directories within or under the root directory. An instance of the queue manager is created for each software application using a message queue of a representative embodiment of the present invention, and that instance is told the location (i.e., the root directory) of the files in the network file system 140 used for message storage. A message to be processed may then be placed in a particular queue by the software application such as, for example, a software application running on any of the front end computers 110, 120, 130, by adding a file representing that message to the appropriately named sub-directory of the network file system 140. Software applications that process such messages, such a applications running on, for example, the batch computers 150, 160, 170 of FIG. 1, may then "receive" messages by checking the contents of or "polling" the network file system 140 and reading the list of files (i.e., messages) in a particular queue (i.e., sub-directory).

In a representative embodiment of the present invention, processors of such messages, such as software applications executing on the batch computers 150, 160, 170 of FIG. 1, may read/write messages without concurrency issues that may be found in many conventional systems. This is accomplished by first attempting to move the file containing the message (i.e., a message file) to be processed out of the queue (i.e., sub-directory) in which the message file was stored while awaiting processing (e.g., by one of the front end computers 110, 120, 130 of FIG. 1), to another sub-directory used to hold the message file while the content of the message is processed. In a representative embodiment of the present invention, the content of the message file is then processed only if the attempt to move the message file is successful. In a representative embodiment of the present invention, this file move operation may be performed using a file system primitive or "system call" of a Unix-like operating system such as, for example, the "rename( )" system call mentioned above, which guarantees that such a file move operation is "atomic." Such an atomic operation is indivisible and is guaranteed to work for only one process at a time, even when executed upon a networked file system such as, for example, the network file system (NFS) 140 of the example of FIG. 1. Further, the atomic property of the "rename( )" system call of a Unix-like operating system ensures that if the such an operation attempted by a software application does not complete successfully, the state of the process/software application attempting such an operation may be restored to that which existed before the operation was attempted.

In a representative embodiment of the present invention, when a particular queued message is to be handled, an application process executing on one of the batch computers 150, 160, 170 may attempt to move the file containing the message from the sub-directory containing the message file (i.e., the directory in which it was placed by one of the front end computers 110, 120, 130), that may be referred to herein as a "pending" sub-directory, to a separate sub-directory, that may be referred to herein as a "processing" sub-directory. If the move of the message file from the "pending" sub-directory to the "processing" sub-directory is successful, then the contents of the message file may be handled or processed in a manner appropriate for the message file contents. The processing of a particular type of message may, for example, be performed by a specific one, or by any of the batch computers 150, 160, 170 of FIG. 1, depending on the contents of the message file, the particular software applications running on each of the batch computers 150, 160, 170, and other factors (e.g., time of day, day of week, and workload of the batch computers 150, 160, 170).

In a representative embodiment of the present invention, it is the distributed algorithm described herein and practiced by each of the plurality of consumers of messages (e.g., batch computers 150, 160, 170) that insures mutual exclusivity of processing of messages from a common queue, avoidance of loss of messages in cases of failure of system elements, and scalability of throughput, while not requiring a separate or additional centralized element that actively manages the storage of messages to the queue, and the retrieval of message from the queue. The distributed algorithm employed by a representative embodiment of the present invention determines the success or failure of an attempt to move a message file from one or more common queues (i.e., sub-directories of messages) to another, and proceeds accordingly, as described in further detail, below.

If the processing of the contents of the message file by the batch computer 150, 160, 170 is successful, the message file is atomically moved to a separate sub-directory of the network file system 140 that may be referred to herein as a "completed" sub-directory, using file move functionality of the operating system of the computer on which the message was processed. If, however, the processing of the message file is not successful, the message file is atomically moved to a separate sub-directory that may be referred to herein as a "failed" sub-directory, again using file move functionality of the operating system of the computer on which the message was processed.

In a representative embodiment of the present invention, message files may be given file names according to a number of parameters including, for example, an identifier of the computer on which the message file was generated, a timestamp representative of the time (e.g., to the second) when the message file was generated, and an identifier (ID) that is unique within each application process to avoid message file naming conflicts. The timestamp parameter enables a representative embodiment of the present invention to ensure that no messages are handled unless their timestamp represents a time that is before or equal to the current time. This permits messages (i.e., messages files) to be placed on the queue (i.e., stored in the sub-directory for a queue) and only handled at a given future time, which may be used as one aspect of retry logic. Such a timestamp may, for example, be created in ISO 8601 format, in which a time and date of, for example, Jun. 10, 2012 at 6:00 PM central time, may be encoded as "20120611T000000Z".

If the root directory and any individual sub-directories (i.e., message queues) of a file system queue in accordance with a representative embodiment of the present invention are located on an NFS-compliant share, the root directory and the sub-directories are seamlessly shared between all NFS clients accessing the file system queue. For example, if two computer systems are using an NFS-compliant network file system, and the file system queue of the present invention resides on a shared NFS "mount point," the two computer systems will (all else being equal) automatically distribute the message processing workload evenly (i.e., 50%/50%) among themselves, enabling software applications to scale linearly. Similarly, if three computer systems such as, for example, the batch computers 150, 160, 170 of FIG. 1 process messages using a message queue in accordance with a representative embodiment of the present invention, those three computers would, all else being equal, automatically split the message processing workload evenly at 33% for each computer. An equal distribution of message processing workload is also true for greater numbers of message processing machines/computer systems.

A message queue in accordance with a representative embodiment of the present invention may be described as a point-to-point queuing system. Such a message queue is suitable, for example, in applications such as message passing that may involve a single process, or that may be between different processes. In addition, a message queue in accordance with a representative embodiment of the present invention is durable in the case of application failure or a need to queue messages for processing at a later time. In a conventional message queue, a message that is placed in a queue to request another process to send email to a customer may not be sent and may be lost, if the system on which the message queue resides is taken out of service. With a durable queuing system such as that described herein with respect to representative embodiments of the present invention, the message to send email to the customer would remain in place in a shared network file system such as the network file system 140 of FIG. 1, until at least one instance of the application that transmits queued email messages is active.

A message queue in accordance with a representative embodiment of the present invention is based on the ability of a software application to access information in a shared file system, and not upon the operation of an external process or external processors for handling/managing message queuing and distribution, as is the case with other message queuing systems. Therefore, in a representative embodiment of the present invention, a software application that is operable on a machine/computer system and that has access to information on a shared network file system, by definition, has access to the message queue. This is not true for other message queuing systems, which may be non-functional or otherwise inaccessible even though the main application may be running and may even be failing as a result of the failure of such a conventional message queuing system.

In addition, the local or distributed nature of a message queue in accordance with a representative embodiment of the present invention simplifies the system or software development life cycle process considerably. This is because, when the computer systems of software developers employ a queuing system of the present invention, the computer systems do not need to connect to a centralized queue manager to do their local work and thereby run the risk of interfering with each other. Instead, the software developer involved in development or testing simply sets a configuration parameter or switch that identifies the location of the file system queue to be used so that it identifies their own local machine. By employing a message queue in accordance with the present invention, the computer system of each software developer thereby has its own local and private message queue instance. When the software developer is ready to operate using a shared file system queue, the configuration parameter or switch is then set to identify the location of the shared file system queue on a network file system. This is an important feature of a representative embodiment of the present invention that avoid the complexities frequently found in conventional implementations of shared message queues. In the example described herein, all front-end and batch computers are connected via the network file system, and use the network file system to communicate both messages and data files. The personal development machines of the individual developers, however, may use only local disk storage, and may not share data with other machines.

Figure 2:
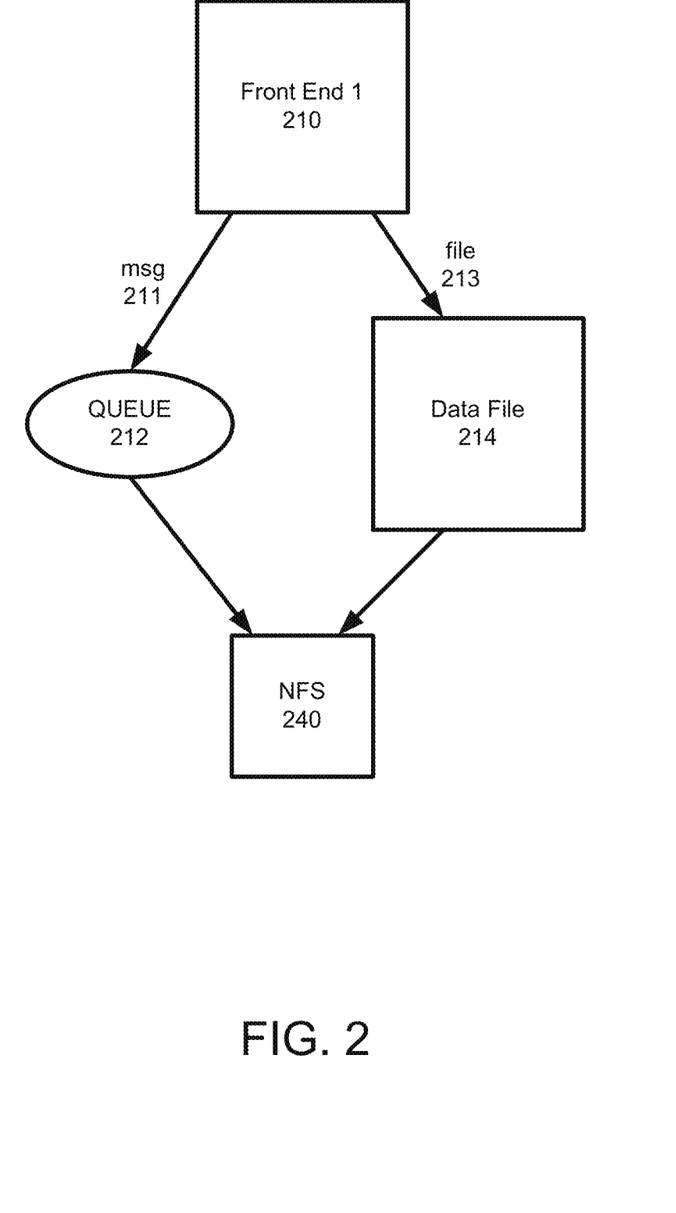
FIG. 2 is a block diagram illustrating the passage of a message and data from a front end computer to the network file system NFS, in accordance with a representative embodiment of the present invention.

FIG. 2 is a block diagram illustrating the passage of a message 211 and data 213 from a front end computer 210 to the network file system NFS 240, in accordance with a representative embodiment of the present invention. The front end computer 210 and network file system 240 of FIG. 2 may correspond to, for example, one of the front end computers 110, 120, 130 and the network file system 140 of FIG. 1, respectively. As shown in FIG. 2, the front end computer 210 of a representative embodiment of the present invention may pass information in two ways to software applications running on computers such as, for example, the batch computers 150, 160, 170 of FIG. 1. First, the software application running on the front end computer 210 may store data to be processed (e.g., an incoming inventory/catalog file of the example being discussed) in a data file in a shared folder on the NFS 240. Second, the front end computer 210 may then place a message (i.e., store a message file) containing metadata for the stored data file in a message queue (i.e., in a sub-directory as described above with respect to FIG. 1).

In a representative embodiment of the present invention, each of the software applications running on a computer that processes queued messages such as, for example, the batch computers 110, 120, 130 of FIG. 1, may periodically check for the presence of message files in the message queue (i.e., the sub-directory), and when a message file is found, the software application may process the message file, in the manner described above with respect to FIG. 1. As discussed above, a representative embodiment of the present invention is arranged in such a way that the software applications on all of the batch computers may receive messages (i.e., access the message file) stored in the message queues (i.e., sub-directories), but only one software application (e.g., a software application running on batch computers 150, 160, 170 of FIG. 1) will process each individual message, due to the atomic nature of some file manipulation operations of Unix-like operating systems, exploited by a representative embodiment of the present invention.

Figure 3:
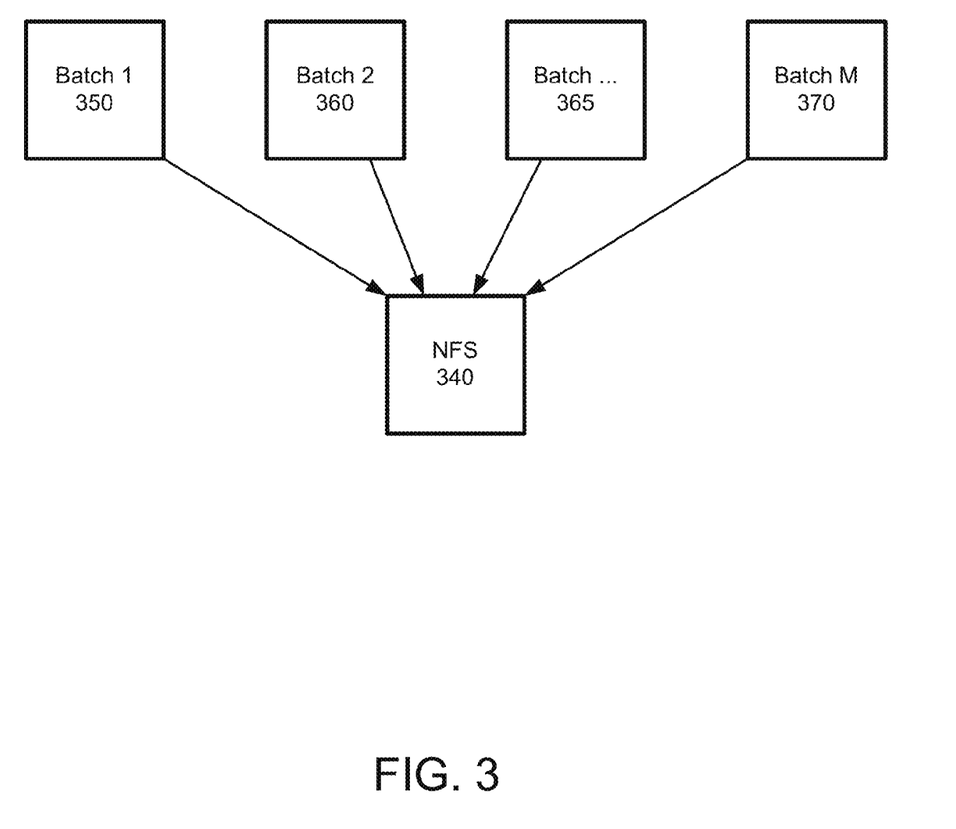
FIG. 3 is a block diagram illustrating a number of batch computers having access to a network file system, which may correspond to, for example, the batch computers and the network file system of FIG. 1, in accordance with a representative embodiment of the present invention.

FIG. 3 is a block diagram illustrating a number of batch computers 350, 360, 365, 370 having access to a network file system 340, which may correspond to, for example, the batch computers 150, 160, 170 and the network file system 140 of FIG. 1, respectively, in accordance with a representative embodiment of the present invention. It should be noted that a group of computers such as the batch computers 350, 360, 365, 370 of FIG. 3 may be referred to herein as a "cluster," and that each computer may run a single software application or multiple software applications, and that the software application(s) that run on the batch computers 350, 360, 365, 370 may be different software applications, or all of batch computers 350, 360, 365, 370 may be running the same software application, without departing from the spirit and scope of the present invention. In some representative embodiments of the present invention, the batch computers 350, 360, 365, 370 of FIG. 3 may run software applications, also referred to herein as "jobs," such as, for example, applications that provide billing support, applications that import and/or export data to and from external systems, and the like. Some of the batch computers 350, 360, 365, 370 may run certain software applications at regular intervals such as, for example, on a daily schedule, some may run certain software applications every half-hour, and others may run various software applications according to other schedules, or may run an application on a full-time basis.

Figure 4:
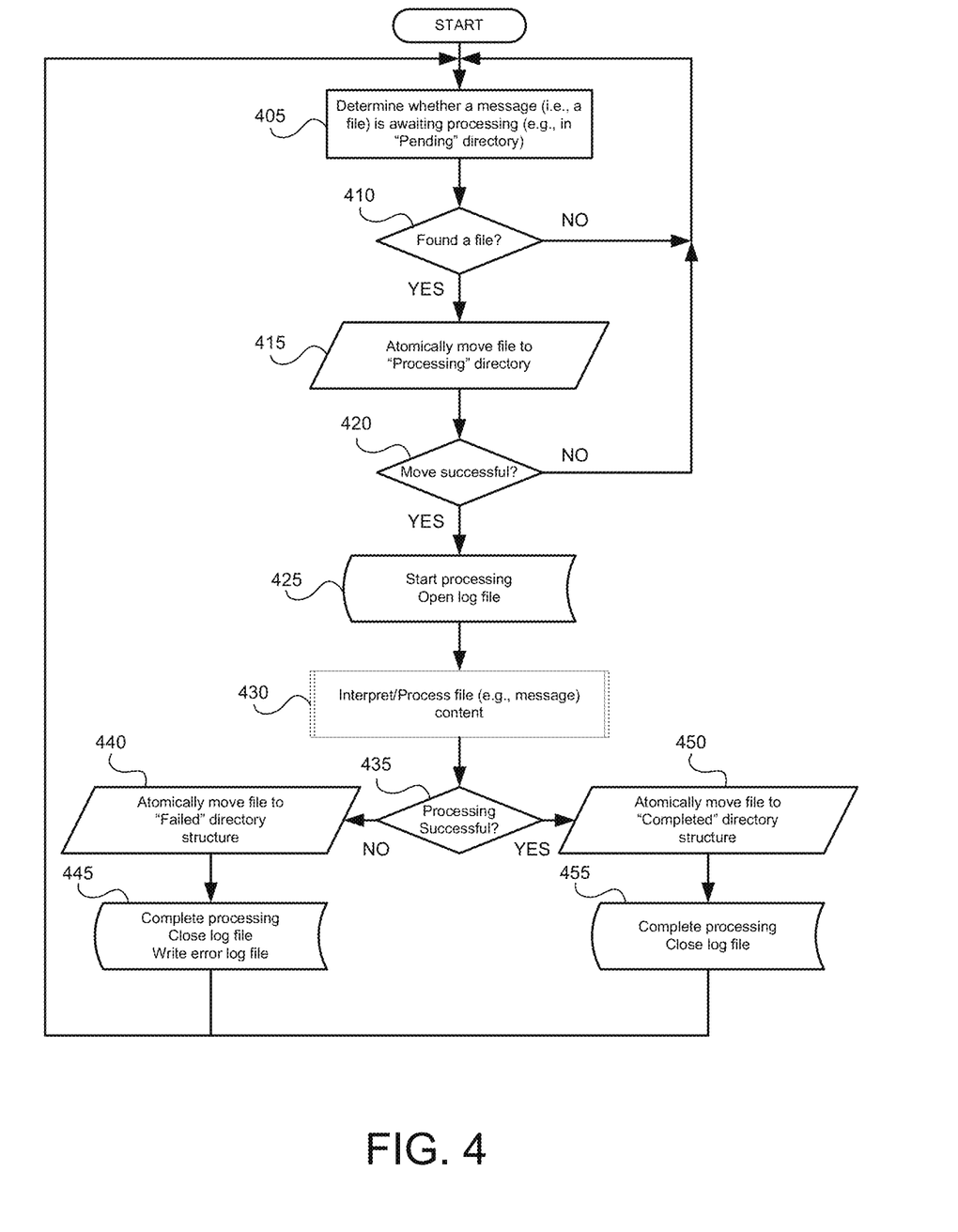
FIG. 4 is a flowchart of an exemplary method of processing queued messages on each computer in a distributed system, in accordance with a representative embodiment of the present invention.

FIG. 4 is a flowchart of an exemplary method of processing queued messages on each computer in a distributed system, in accordance with a representative embodiment of the present invention. The method of FIG. 4 may, for example, be performed by any of the batch computers 150, 160, 170 of FIG. 1 and the batch computers 350, 360, 365, 370 of FIG. 3. The method of FIG. 4 begins at block 405, that first occurs at some point following the startup of a software application for processing queued messaged running on a computer such as, for example, the batch computers 150, 160, 170 of FIG. 1 and the batch computers 350, 360, 365, 370 of FIG. 3. At block 405, the method of FIG. 4 determines whether there are any messages awaiting processing. As discussed above with respect to FIG. 1, this may be by checking for the presence of message files in a designated directory of a file system such as, for example, a "pending" sub-directory. Such a check may be made, for example, by retrieving a list of the files (i.e., messages) present in the "pending" directory.

If the method of FIG. 4 determines, at block 410, that at least one message is available for processing, the method proceeds to block 415, where the method attempts to move a message file from the "pending" sub-directory to another directory in the file system such as, for example, a "processing" sub-directory. In a representative embodiment of the present invention, the move of the file is attempted using file management functionality of a Unix-like operating system that performs file moves "atomically." That is, a file move in a Unix-like operating system is indivisible and succeeds for only one of two or more entities that concurrently attempt to move any given file, while any other entities attempting to move the same file are provided information needed to recover from the failed file move attempt.

If, at block 415, the move of the message file is not successful, the method of FIG. 4 then returns to block 405, and again checks whether any messages are available for processing by retrieving the list of files awaiting processing.

If the method of FIG. 4 finds at block 415 that the move of the waiting message from the "pending" sub-directory is successful, the method proceeds to block 420, where processing of the message, now located in "processing" sub-directory, begins. In the exemplary method of FIG. 4, a first action may be to open a "log file," which may be used to record or store details of the processing of the message file. The method of FIG. 4 then proceeds to block 430, where the message content is processed. It should be noted that the content of the message file is processed only of the move of the message file is successful. In some representative embodiments of the present invention, the content of the message file may comprise metadata identifying an associated data file stored in the network file system, where the bulk of processing may be upon the data file. Because details of the processing of the actual message content represented by block 430 are not necessarily relevant to the operation of a message queue in accordance with a representative embodiment of the present invention, and depend primarily upon the nature of the system employing a message queue such as that described herein, more specific details of processing of a message are not provided here.

Following processing of the message at block 430, the method of FIG. 4 proceeds to block 435, where the method of FIG. 4 determines whether the processing of the message was successful. In the example of FIG. 4, if the processing of the message was not successful, the method, at block 440, may move the message to a directory designated for messages whose processing failed. The move of the message file to what may be referred to herein as a "failed" sub-directory is done atomically. The method may then, as at block 445, complete processing of the message by closing the "log file,"

and write the "log file" containing information abut the failed processing of the message file, to persistent storage.

If, however, at block 435, the method of FIG. 4 determines that the processing of the message was successful, the method then, at block 450, moves the message to a directory designated for messages whose processing completed successfully. The move of the message file to what may be referred to herein as a "completed" sub-directory is done atomically, and the method may then, at block 455, complete processing of the message by closing the "log file," and writing the "log file" with any information about the processing of the message file, to persistent storage.

Figure 5:
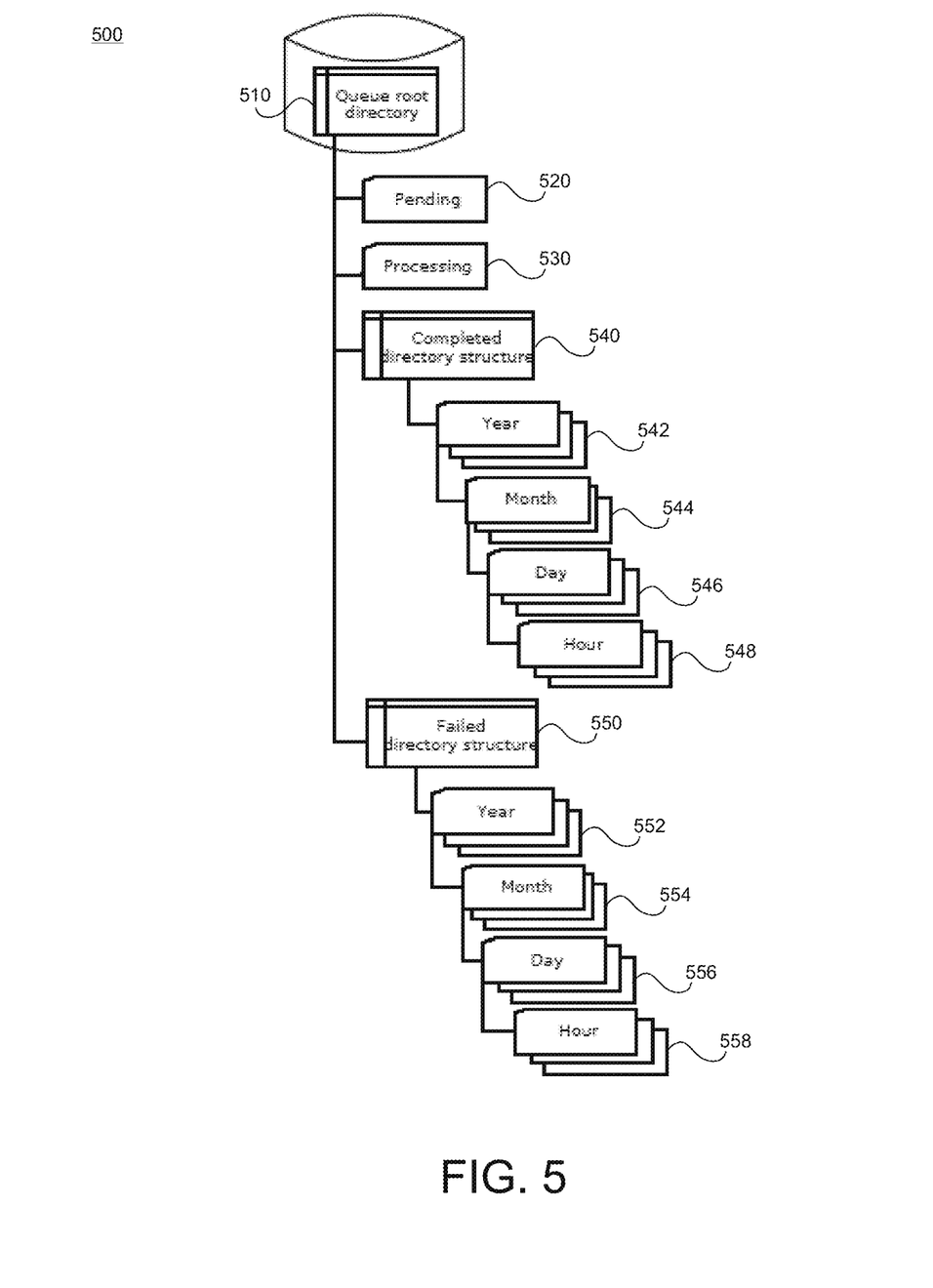
FIG. 5. is an exemplary directory structure for a message queue, in accordance with a representative embodiment of the present invention.

FIG. 5. is an exemplary directory structure 500 for a message queue, in accordance with a representative embodiment of the present invention. The directory structure 500 of FIG. 5 may be realized as elements of a file system of a Unix-like operating system such as network file systems 140, 340 of FIGS. 1 and 3, as described above. As illustrated in FIG. 5, the exemplary directory structure 500 includes a "root" directory 510 that includes a "pending" sub-directory 520, a "processing" sub-directory 530, a "completed" sub-directory 540, and a "failed" sub-directory 550. The "pending" sub-directory 520, "processing" sub-directory 530, "completed" sub-directory 540, and "failed" sub-directory 550 may correspond, for example, to the similarly-named elements described above with respect to FIG. 1. The directory structure 500 may be used, for example, by a method of processing queued messages by a number of computers in a distributed system, where all of the computers have access to a network file system such as the network file systems 140, 340, discussed above. It should be noted that the exact arrangement of the directories and files, and the names used for the various files of FIG. 5 do not necessarily represent specific limitations of the present invention and are for illustrative purposes only, and that the inventive concepts described herein may be employed with other suitable directory structures and file names, without departing from the spirit and scope of the present invention.

As previously described above, a directory such as the "pending" sub-directory 520 may be used by a computer such as, for example, the front end computers 110, 120, 130 of FIG. 1 to store files representing messages awaiting processing, while a separate directory such as the "processing" sub-directory 530 may be used to store message files during the processing of the message by a computer such as, for example, one of the batch computers 150, 160, 170, 350, 360, 365, 370 of FIGS. 1 and 3. An attempt may be made to move each message from the "pending" sub-directory 520 to the "processing" sub-directory 530 prior to processing, using an atomic file move operation of a Unix-like operating system of the computer on which software application resides. The content of the message may then be processed by a software application, only if the move of the message to the "processing" sub-directory 530 is successful.

Following processing of the message, the software application performing the message processing may move the message file to the "completed" sub-directory 540, if the processing of the message completed successfully, or to the "failed" sub-directory 550, if the message processing failed to complete successfully. In the example of FIG. 5, each of the "completed" and "failed" sub-directories 540, 550 is shown as having a number of sub-directories identified by year 542, 552, month 544, 554, day 546, 556, and hour 548, 558. In this manner, the software application that processes the queued messages may organize message files and associated information (e.g., log files) for the messages processed successfully and for messages for which processing failed.

Figure 6:
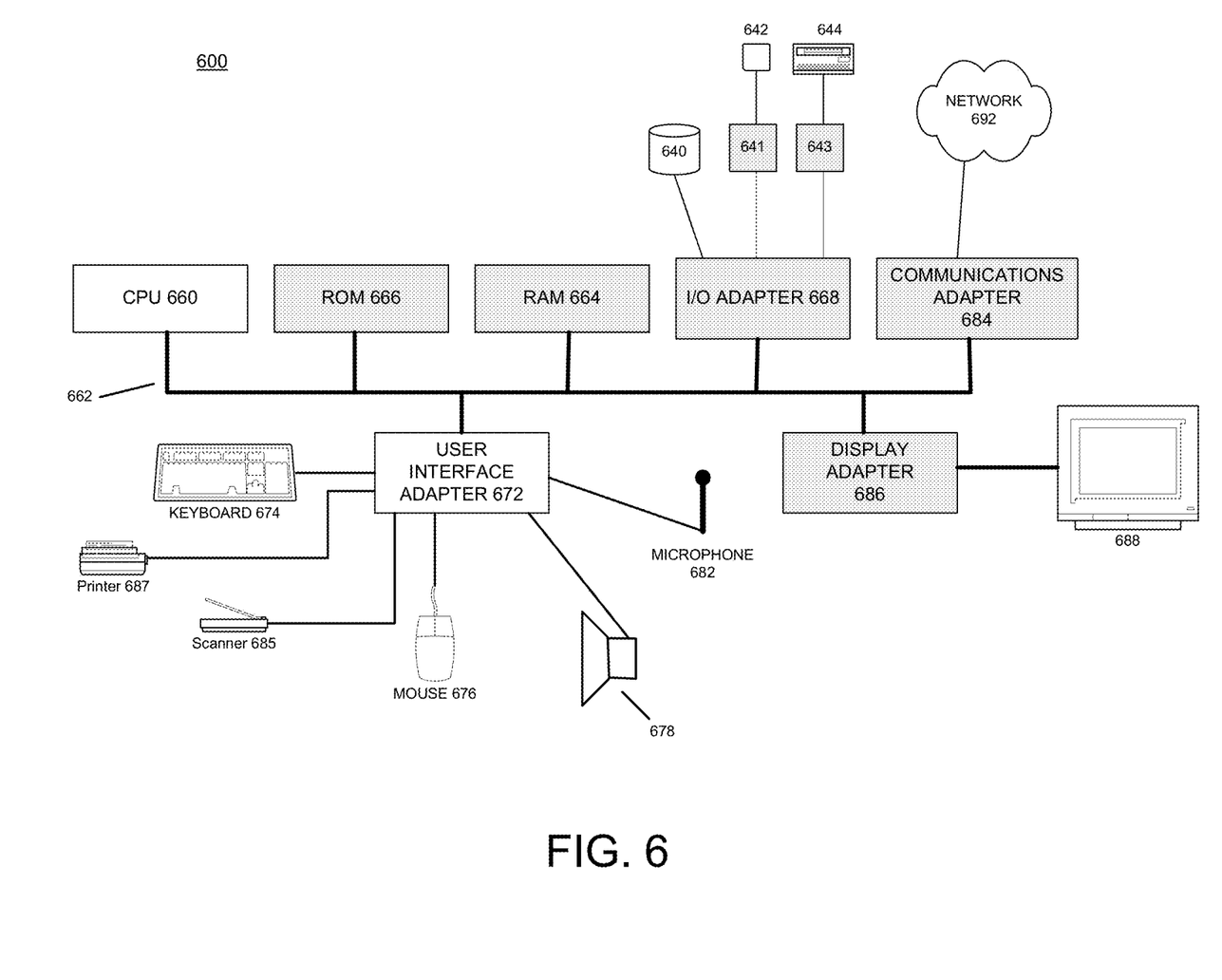
FIG. 6 is a block diagram of an exemplary computer system, in which aspects of a representative embodiment of the present invention may be practiced.

FIG. 6 is a block diagram of an exemplary computer system 600, in which aspects of a representative embodiment of the present invention may be practiced. Selected elements of the computer system 600 may be included, for example, in the front end computers 110, 120, 130, the network file system 140, and the batch computers 150, 160, 170 of FIG. 1, and the network file system 340 and batch computers 350, 360, 365, 370 of FIG. 3, as appropriate. The computer 600 includes a processor 660 that is interconnected via system bus 662 to random access memory (RAM) 664, read only memory (ROM) 666, an input/output adapter 668, a user interface adapter 672, a communications adapter 684, and a display adapter 686. The input/output adapter 668 connects peripheral devices such as hard disc drive 640, floppy disc drives 641 for reading removable floppy discs 642, and optical disc drives 643 for reading removable optical disc 644. The user interface adapter 672 connects devices such as a keyboard 674, a speaker 678, a microphone 682, optical scanner 685, and printer 687 to the bus 662. The microphone 682 generates audio signals that are digitized by the user interface adapter 672. The speaker 678 receives audio signals that are converted from digital samples to analog signals by the user interface adapter 672. The display adapter 686 connects a display 688 to the bus 662.

A representative embodiment of the present invention may be implemented as executable instructions resident in the RAM 664 or ROM 666 of one or more computers 600 may be configured as described above with respect to FIGS. 1-5. Until required by the computer 600, the executable instructions may be stored in another memory readable by the processor 660, such as hard disc drive 640, floppy disc 642, or optical disc 644. One skilled in the art would appreciate that the physical storage of the executable instructions physically changes the medium upon which it is stored electrically, magnetically, or chemically so that the medium carries information readable by a processor of the computer 600. It should also be noted that all of the elements shown in FIG. 6 may not be present in each computer of a representative embodiment of the present invention.

A representative embodiment of the present invention provides a reliable and persistent way to communicate tasks and information between machines, and effectively and efficiently distributes the workload of dispatching messages across multiple machines, enabling it to handle significant load generated by a large number of message producers. In addition, a representative embodiment of the present invention operates in a persistent manner in case of power or other system failure.

Aspects of the present invention may be seen in a method ensuring processing of each of a first collection of files in a shared file system by only one of a plurality of computers processing the first collection. Such a method may comprise, in any computer of the plurality of computers, retrieving a list of files of the first collection from the shared file system, and selecting a first file from the list of files, using a first identifier associated with the first file. The method may also comprise, in a first atomic operation upon the shared file system, attempting to associate a second identifier with the first file and to dissociate the first identifier from the first file. The method may comprise determining whether the first atomic operation was successful; and processing content of the first file using the second identifier, only if the first atomic operation was successful. In some representative embodiments of the present invention, the first file may comprise metadata identifying a data file separate from the first file, and processing content may comprise processing the data file identified by the metadata.

In some representative embodiments of the present invention, the method may further comprise, in a second atomic operation upon the shared file system, attempting to associate a third identifier with the first file and to dissociate the second identifier from the first file. The third identifier may locate the first file in a second collection in the shared file system separate from the first collection, if the second atomic operation is successful, and may locate the first file in a third collection in the shared file system separate from the first collection and the second collection, if the second atomic operation is not successful.

In various representative embodiments of the present invention, the shared file system may be external to each of the plurality of computers, and may be compliant with one or more of the Internet Engineering Task Force (IETF) specifications identified as RFC 1094, RFC 1813, or a later follow-on specification. In addition, the first atomic operation and the second atomic operation may be functionality provided by an operating system of each of the plurality of computers.

Additional aspects of the present invention may be found in a system that ensures processing of each of a first collection of files in a shared file system by only one of a plurality of computers processing the first collection. Such a system may comprise at least one processor enabled to communicatively couple to the shared file system, where the at least one processor may be operable to, at least, receive a list of files of the first collection from the shared file system, and select a first file from the list of files, using a first identifier associated with the first file. The at least one processor may, in a first atomic operation upon the shared file system, attempt to associate a second identifier with the first file and to dissociate the first identifier from the first file. In addition, the at least one processor may determine whether the first atomic operation was successful, and may process content of the first file using the second identifier, only if the first atomic operation was successful. In some representative embodiments of the present invention, the first file may comprise metadata identifying a data file separate from the first file, and processing content may comprise processing the data file identified by the metadata.

In a representative embodiment of the present invention, the at least one processor may be operable to, in a second atomic operation upon the shared file system, attempt to associate a third identifier with the first file and to dissociate the second identifier from the first file. The third identifier may locate the first file in a second collection in the shared file system separate from the first collection, if the second atomic operation is successful, and may locate the first file in a third collection in the shared file system separate from the first collection and the second collection, if the second atomic operation is not successful. The shared file system may be external to each of the plurality of computers, and may be compliant with one or more of the Internet Engineering Task Force (IETF) specifications identified as RFC 1094, RFC 1813, or a later follow-on specification. In addition, the first atomic operation and the second atomic operation may be functionality provided by an operating system of each of the plurality of computers.

Further aspects of the present invention may be observed in a non-transient computer-readable medium having a plurality of code sections, where each code section comprises instructions executable by at least one processor. The instructions may cause the at least one processor to perform a method of processing each of a first collection of files in a shared file system by only one of a plurality of computers processing the first collection, where the method comprises receiving a list of files of the first collection from the shared file system, and selecting a first file from the list of files, using a first identifier associated with the first file. The method may, in a first atomic operation upon the shared file system, attempt to associate a second identifier with the first file and to dissociate the first identifier from the first file. The method may also determine whether the atomic operation was successful, and process content of the first file using the second identifier, only if the first atomic operation was successful. In various representative embodiments of the present invention, the first file may comprise metadata identifying a data file separate from the first file, and processing content may comprise processing the data file identified by the metadata.

In a representative embodiment of the present invention, the method may further comprise, in a second atomic operation upon the shared file system, attempting to associate a third identifier with the first file and to dissociate the second identifier from the first file. The third identifier may locate the first file in a second collection in the shared file system separate from the first collection, if the second atomic operation is successful, and may locate the first file in a third collection in the shared file system separate from the first collection and the second collection, if the second atomic operation is not successful. The shared file system may be external to each of the plurality of computers, and the shared file system may be compliant with one or more of the Internet Engineering Task Force (IETF) specifications identified as RFC 1094, RFC 1813, or a later follow-on specification.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method ensuring processing of each file of a first collection of files in a shared file system by only one computer, of a plurality of computers, processing files from the first collection, the method comprising:

in each computer of the plurality of computers,
(i) determining whether at least one file is available in the first collection of files by retrieving a list of files of the first collection of files from one location in the shared file system that is accessible to all computers of the plurality of computers;
(ii) selecting a first file from the list of files, if it is determined that at least one file is available in the first collection of files;
(iii) continuing to determine whether at least one file is available, if it is determined that no files are available in the first collection of files;
(iv) responsive to selecting the first file, attempting to move the first file from the first collection of files for processing, wherein the move is an indivisible operation that succeeds for only one computer of two or more computers of the plurality of computers that concurrently attempt to move any given file;
(v) responsive to attempting to move the first file, determining whether the attempt to move the first file was successful;
(vi) processing content of the first file, only if the move operation was successful; and
(vii) returning to step (i), if the move operation was not successful.

2. The method of claim 1, wherein the first file comprises metadata identifying a data file separate from the first file, and processing content comprises processing the data file identified by the metadata.

3. The method of claim 1, wherein the method further comprises:
in a second move operation upon the shared file system, attempting to move the first file to a collection of files separate from the first collection of files, based upon success of the processing of content of the first file.

4. The method of claim 3, wherein the second move operation locates the first file in a second collection of files in the shared file system separate from the first collection of files, if the processing is successful, and locates the first file in a third collection of files in the shared file system separate from the first collection of files and the second collection of files, if the processing is not successful.

5. The method of claim 1, wherein the shared file system is external to each of the plurality of computers.

6. The method of claim 1, wherein the shared file system is compliant with one or both of the Internet Engineering Task Force (IETF) specifications identified as RFC 1094 and RFC 1813.

7. The method of claim 1, wherein the first move operation and the second move operation are functionality provided by an operating system of each of the plurality of computers.

8. A system that ensures processing of each file of a first collection of files in a shared file system by only one computer, of a plurality of computers, processing files from the first collection, the system comprising:

in each computer of the plurality of computers, at least one processor enabled to communicatively couple to the shared file system, the at least one processor operable to, at least:
(i) determine whether at least one file is available in the first collection of files by retrieve a list of files of the first collection of files from one location in the shared file system that is accessible to all computers of the plurality of computers;
(ii) select a first file from the list of files, if it is determined that at least one file is available in the first collection of files;
(iii) continue to determine whether at least one file is available, if it is determined that no files are available in the first collection of files;
(iv) responsive to selecting the first file, attempt to move the first file from the first collection of files for processing, wherein the move is an indivisible operation that succeeds for only one computer of two or more computers of the plurality of computers that concurrently attempt to move any given file;
(v) responsive to the attempt to move the first file, determine whether the attempt to move the first file was successful;
(vi) process content of the first file, only if the move operation was successful; and
(vii) return to step (i), if the move operation was not successful.

9. The system of claim 8, wherein the first file comprises metadata identifying a data file separate from the first file, and processing content comprises processing the data file identified by the metadata.

10. The system of claim 8, wherein the at least one processor is operable to, at least:
in a second move operation upon the shared file system, attempt to move the first file to a collection of files separate from the first collection of files, based upon success of the processing of content of the first file.

11. The system of claim 10, wherein the second move operation locates the first file in a second collection of files in the shared file system separate from the first collection of files, if the processing is successful, and locates the first file in a third collection of files in the shared file system separate from the first collection of files and the second collection of files, if the processing is not successful.

12. The system of claim 8, wherein the shared file system is external to each of the plurality of computers.

13. The system of claim 8, wherein the shared file system is compliant with one or both of the Internet Engineering Task Force (IETF) specifications identified as RFC 1094 and RFC 1813.

14. The system of claim 8, wherein the first move operation and the second move operation are functionality provided by an operating system of each of the plurality of computers.

15. A non-transitory computer-readable medium having a plurality of code sections, each code section comprising instructions executable by at least one processor, the instructions causing the at least one processor to perform a method of processing each file of a first collection of files in a shared file system by only one computer, of a plurality of computers, processing files from the first collection, the method comprising:
(i) determining whether at least one file is available in the first collection of files by retrieving a list of files of the first collection of files from one location in the shared file system that is accessible to all computers of the plurality of computers;
(ii) selecting a first file from the list of files, if it is determined that at least one file is available in the first collection of files;

(iii) continuing to determine whether at least one file is available, if it is determined that no files are available in the first collection of files;

(iv) responsive to selecting the first file, attempting to move the first file from the first collection of files for processing, wherein the move is an indivisible operation that succeeds for only one computer of two or more computers of the plurality of computers that concurrently attempt to move any given file;

(v) responsive to attempting to move the first file, determining whether the attempt to move the first file was successful;

(vi) processing content of the first file, only if the move operation was successful; and (vii) returning to step (i), if the move operation was not successful.

16. The computer-readable medium of claim 15, wherein the first file comprises metadata identifying a data file separate from the first file, and processing content comprises processing the data file identified by the metadata.

17. The computer-readable medium of claim 15, wherein the method further comprises:

in a second move operation upon the shared file system, attempting to move the first file to a collection of files separate from the first collection of files, based upon success of the processing of content of the first file.

18. The computer-readable medium of claim 17, wherein the second move operation locates the first file in a second collection of files in the shared file system separate from the first collection of files, if the processing is successful, and locates the first file in a third collection of files in the shared file system separate from the first collection of files and the second collection of files, if the processing is not successful.

19. The computer-readable medium of claim 15, wherein the shared file system is external to each of the plurality of computers.

20. The computer-readable medium of claim 15, wherein the shared file system is compliant with one or both of the Internet Engineering Task Force (IETF) specifications identified as RFC 1094 and RFC 1813.

21. The computer-readable medium of claim 15, wherein the first move operation and the second move operation are functionality provided by an operating system of each of the plurality of computers.

* * * * *